United States Patent
Lee et al.

(10) Patent No.: US 9,525,763 B1
(45) Date of Patent: Dec. 20, 2016

(54) MOBILE TERMINAL AND ASSEMBLING METHOD THEREOF

(71) Applicant: LG Electronics Inc., Seoul (KR)

(72) Inventors: Jinhwan Lee, Seoul (KR); Youngil Lee, Seoul (KR); Junmin Choi, Seoul (KR); Daewoong Jon, Seoul (KR); Taeki Um, Seoul (KR); Junhong Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/973,495

(22) Filed: Dec. 17, 2015

(30) Foreign Application Priority Data

Aug. 5, 2015 (KR) .................. 10-2015-0110448

(51) Int. Cl.
*H04M 1/00* (2006.01)
*H04M 1/02* (2006.01)
*H04M 1/18* (2006.01)

(52) U.S. Cl.
CPC ......... *H04M 1/0249* (2013.01); *H04M 1/0274* (2013.01); *H04M 1/0277* (2013.01); *H04M 1/18* (2013.01)

(58) Field of Classification Search
CPC H04M 1/0249; H04M 1/0277; H04M 1/0274; H04M 1/18
USPC ................. 455/575.1, 575.3, 550.1
See application file for complete search history.

(56) References Cited

U.S. PATENT DOCUMENTS

| 8,380,258 | B2* | 2/2013 | Kim | H01R 13/2421 455/128 |
| 8,489,155 | B2* | 7/2013 | Hasegawa | H04M 1/0212 455/566 |
| 2008/0291647 | A1* | 11/2008 | Hirota | H04M 1/026 361/752 |
| 2012/0025678 | A1* | 2/2012 | Morishima | H04N 5/2252 312/111 |
| 2014/0093116 | A1* | 4/2014 | Liu | H01R 24/58 381/384 |
| 2014/0162736 | A1* | 6/2014 | Shin | H04B 1/3888 455/575.8 |
| 2016/0033996 | A1* | 2/2016 | Lee | G06F 1/1658 361/679.26 |

FOREIGN PATENT DOCUMENTS

JP 2000-224070 A 8/2000
JP 2010-277750 A 12/2010
(Continued)

*Primary Examiner* — Khai M Nguyen
(74) *Attorney, Agent, or Firm* — Birch, Stewart, Kolasch & Birch, LLP

(57) ABSTRACT

A mobile terminal including a front case including an ear jack hole formed in one end, an ear jack module having a plug inserting portion extended in a first direction, penetrating from one end to the other end of the ear jack module, one end thereof arranged in parallel with the ear jack hole, a rear case configured to cover the back side of the front case, a first fixing bracket projected from the front case in a direction to the back side and comprising a first screw hole arranged in parallel with the plug inserting portion, a second fixing bracket projected from a front side of the rear case, adjacent to the first fixing bracket, and comprising a second screw hole arranged in parallel with the plug inserting portion, and a screw penetrating the ear jack hole, the first screw hole and the second screw hole is provided.

18 Claims, 11 Drawing Sheets

(56) References Cited

FOREIGN PATENT DOCUMENTS

| KR | 10-2002-0083810 A | 11/2002 |
| KR | 10-2005-0011778 A | 1/2005 |
| KR | 10-2014-0110472 A | 9/2014 |

* cited by examiner

MOBILE TERMINAL AND ASSEMBLING METHOD THEREOF

CROSS-REFERENCE TO RELATED APPLICATIONS

This application claims priority to Korean Patent Application No. 10-2015-0110448 filed on Aug. 5, 2015 in Korea, the entire contents of which is hereby incorporated by reference in its entirety.

BACKGROUND OF THE DISCLOSURE

Field of the Disclosure

Embodiments of the present disclosure relate to a mobile terminal including a coupling structure not exposed outside and an assembling method thereof.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Electronic components are mounted between a front case and a rear case in such the mobile terminal. The front case and the rear case are coupled to each other to prevent exposure of the mounted internal components. A screw may be used in coupling the front case and the rear case to each other. In this instance, the coupling may be strengthened enough not to separate the front and rear cases from each other and there could be a disadvantage of the screw's exposure outside.

In contrast, only a hook formed along each edge area of the front and rear cases may be used in coupling the front and rear cases to each other. In this instance, the coupling force could be substantially weak enough to cause a disadvantage of easy separation which could be caused by an external shock.

SUMMARY OF THE DISCLOSURE

An object of the present disclosure is to provide a mobile terminal which may prevent a screw from exposing outside, using a plug inserting portion of an ear jack module.

Embodiments of the present disclosure may provide a mobile terminal includes a front case comprising a component disposing portion provided in a back side and an ear jack hole formed in one end; an ear jack module disposed in the component disposing portion and arranged adjacent to the ear jack hole; a plug inserting portion extended in a first direction, penetrating from one end to the other end of the ear jack module, and arranged in parallel with the ear jack hole; a rear case configured to cover the back side of the front case; a first fixing bracket projected from the component disposing portion in a direction to the back side, adjacent to the other end of the ear jack, and comprising a first screw hole arranged in parallel with the plug inserting portion; a second fixing bracket projected from a front side of the rear case, adjacent to the first fixing bracket, and comprising a second screw hole arranged in parallel with the plug inserting portion; and a screw penetrating the ear jack hole, the first screw hole and the second screw hole.

A diameter of the screw may be smaller than a diameter of the ear jack hole and a diameter of the plug inserting portion.

The ear jack hole may be formed by a first ear jack hole formed in the front case in a semi-circular shape and a second ear jack hole formed in the rear case in a semi-circular shape, which are coupled to each other.

A screw thread may be formed in each of the first and second screw holes.

The mobile terminal may further include a rail beam coupled to the rear case and configured to slide in a first direction and a second direction which is the reverse direction of the first direction, wherein the second fixing bracket is coupled to the rail beam.

The rail beam may be configured to slide in the second direction, when the screw is inserted in the second screw hole of the second fixing bracket.

The mobile terminal may further include a bump projected from a front side of the rear case and comprising a first diameter of one end which is larger than a second diameter of the other end adjacent to the rear case; a first bump hole larger than the first diameter of the bump formed in the rail beam; and a second bump hole extended from the first pump hole in the second direction and comprising a diameter smaller than the first diameter of the bump.

The bump may be located in an end of the second bump hole in the first state, and located in a middle portion of the second bump hole in the second state.

The mobile terminal may further include a rail hook projected from the rear case in a direction to a front side and comprising an inclined surface; and first and second rail hook holes arranged in the rail beam in the first direction in parallel with each other, wherein the rail hook is inserted in the first rail hook hole when the rail beam is in the first state and inserted in the second rail hook hole in the second rail hook hole when the rail beam is in the second state.

The mobile terminal may further include a first boss bracket projected from a front side of the rear case; a second boss bracket projected from the rail beam in a direction to the front side of the mobile terminal; a boss hole formed in the first boss bracket in a section direction; and a boss projected from the second boss bracket in the second direction and inserted in the boss hole.

The ear jack module may be provided in a predetermined portion of the mobile terminal, and the first boss bracket and the second boss bracket may be provided in the other portion of the mobile terminal.

The boss may be extended from the bracket in the same direction as the rail beam is moved from the first state to the second state.

The mobile terminal may further include a first coupling hook projected from an edge portion of the front case in a direction to a back side of the front case; and a second coupling hook projected from an edge portion of the rear case in a direction to a front side of the rear case and coupled to the first coupling hook.

The mobile terminal may further include a pinion gear rotary together with the screw; a rack gear rectilinearly movable, with engaging with a tooth of the pinion gear; a wire rail formed in the second coupling hook along an edge portion of the rear case; a wire arranged along the wire rail and connected to the rack gear to move together with the rack gear; and a supporting block connected to the wire and configured to move along the wire rail together with the wire, wherein the supporting block is provided in the second coupling hook and configured to prevent the second coupling hook from being separated from the first coupling hook.

In another aspect of the present disclosure, an assembling method of a mobile terminal comprising steps of mounting an ear jack module between an ear jack hole formed in one end of a front case and a first fixing bracket projected from a back side of the front case; coupling a rear case to the back side of the front case to arrange a second fixing bracket in parallel with the first fixing bracket; and fastening a screw penetrating the first and second fixing brackets via the ear jack hole and a plug inserting portion of the ear jack module.

The assembling method of mobile terminal may further include a method of slidingly coupling a rail beam comprising the second fixing bracket to the rear case in a first direction, before coupling the rear case to the back side of the rear case.

The step of coupling the rear case to the back side of the front case may include a step of coupling a first coupling hook projected from an edge portion of the front case in a direction to the back side of the front case to a second coupling hook projected from an edge portion of the rear case in a direction to the front side of the rear case, and the step of fastening the screw may include a step of moving a supporting block connected to a wire rectilinearly movable according to the rotation of the screw to a position adjacent to the second hook.

According to at least one of the embodiments of the present disclosure, there are following advantageous effects.

According to at least one of the embodiments, the coupling force between the front case and the rear case is enhanced and the exposure of the screw is prevented, using the screw as well as the hook. Accordingly, the mobile terminal has an advantage of an excellent external design.

Moreover, when one screw is fastened, the front case 101 and the rear case are coupled to each other at several points simultaneously. Accordingly, the coupling force between the front case and the rear case may be enhanced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1A:
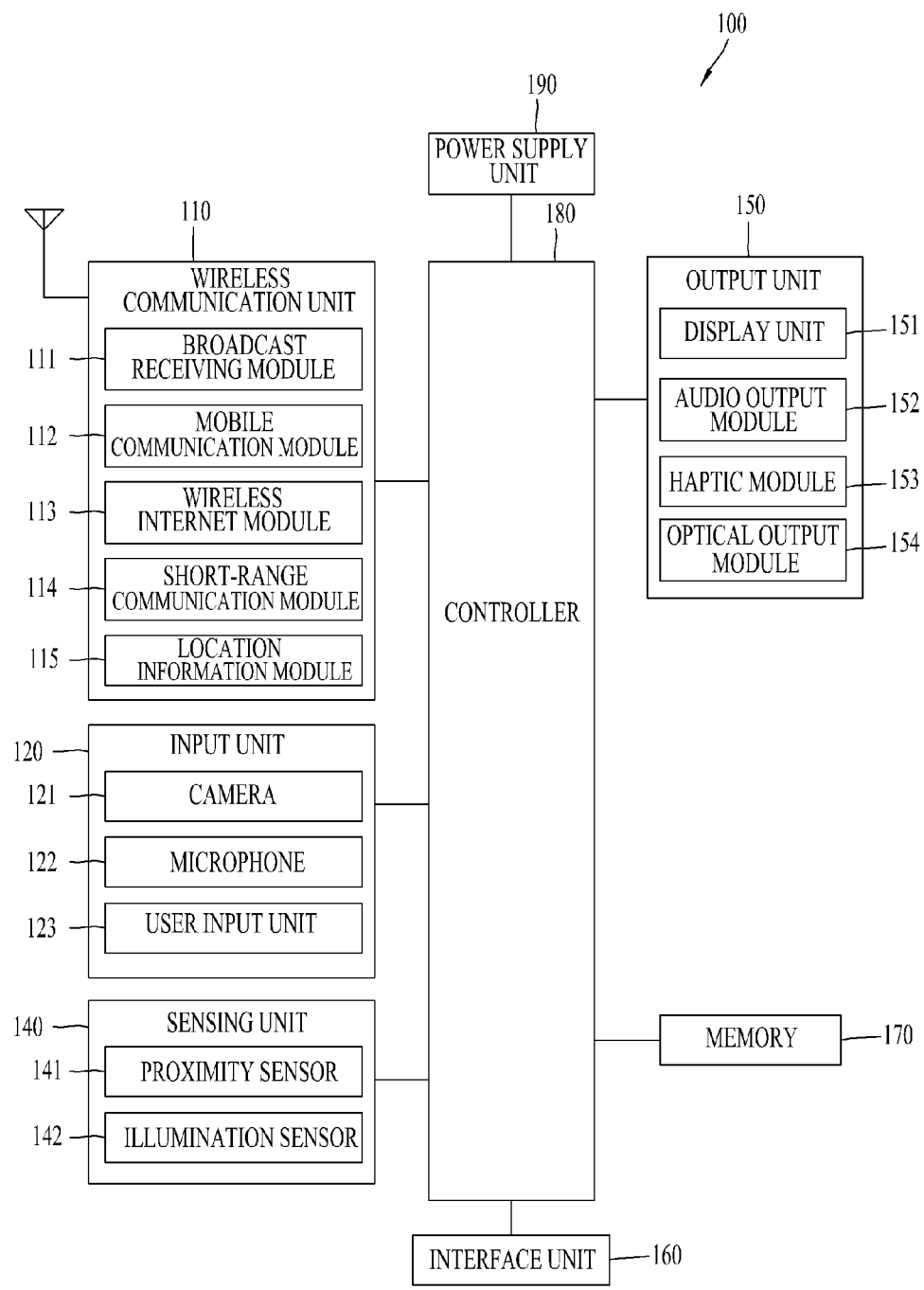
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
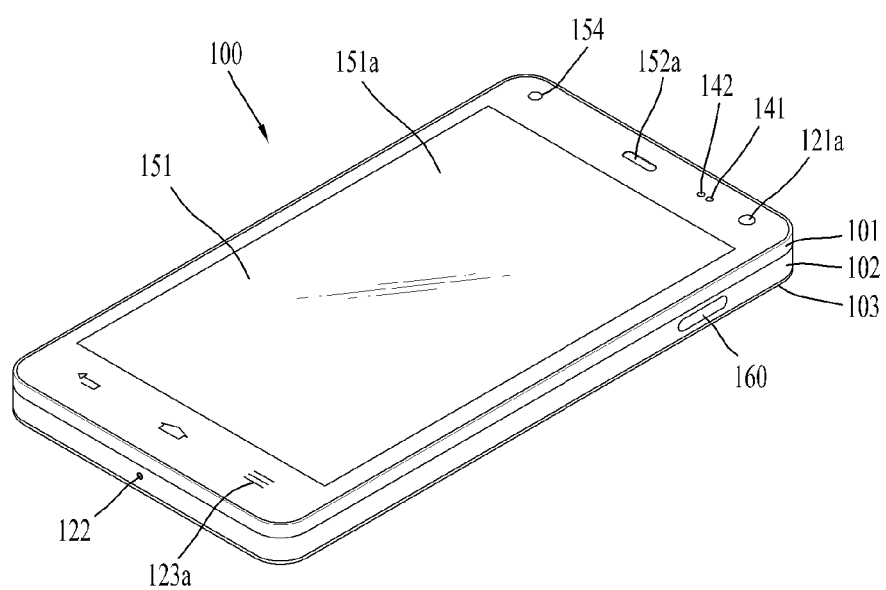
FIGS. 1B and 1C are conceptual views of one example of the mobile terminal, viewed from different directions.
Figure 1C:
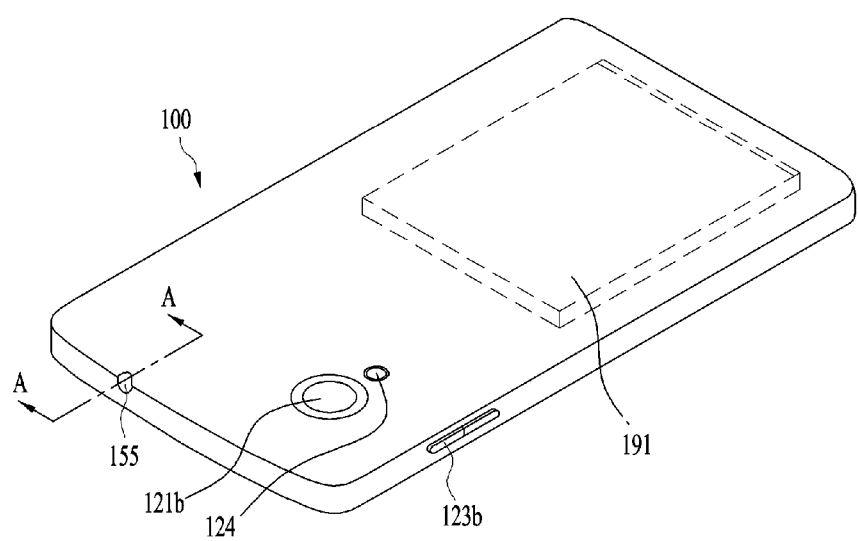

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of such the components may be executed in cooperation to operate and control the mobile terminal in accordance with the various embodiments which will be described hereafter or to embody a control method of such the mobile terminal. The operation, the control or the control method may be realized in the mobile terminal by the driving of one or more application programs stored in the memory 170 (see FIGS. 1b and 1c)

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this instance, the terminal body may be understood as a concept considering the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the mobile terminal 100, electronic components are mounted between the front case 101 and the rear case 102. The front case 101 and the rear case 102 are coupled to each other to prevent exposure of the mounted internal electronic components. A screw 255 may be used in coupling the front case and the rear case to each other. In this instance, the coupling may be strengthened enough not to separate the front and rear cases from each other and there could be the disadvantage of the screw 255's exposure outside.

In case a back cover 103 is coupled to a back side of the rear case 102, the screw 255 is inserted in a direction of a back side of the rear case 102 and coupled to the front case 101. After that, the back cover 103 is coupled to the back side of the rear case 102 to cover a head part of the screw 255.

However, a head of the screw 255 is shown in back side or lateral side of the mobile terminal 100 with no back cover 103, so that the exterior design of the mobile terminal could deteriorate disadvantageously. In contrast, when the front case 101 and the rear case 102 are coupled to each other by only the coupling hooks 101 and 102 formed around the front and rear cases 101 and 102, without the screw 255, the coupling could be weak and the cases could be dissembled from each other easily.

Accordingly, the embodiment of the present disclosure may provide the coupling structure for coupling the cases, using a plug inserting portion 156 to prevent the screw 255 from exposing to the external surface of the mobile terminal 100.

Figure 2:
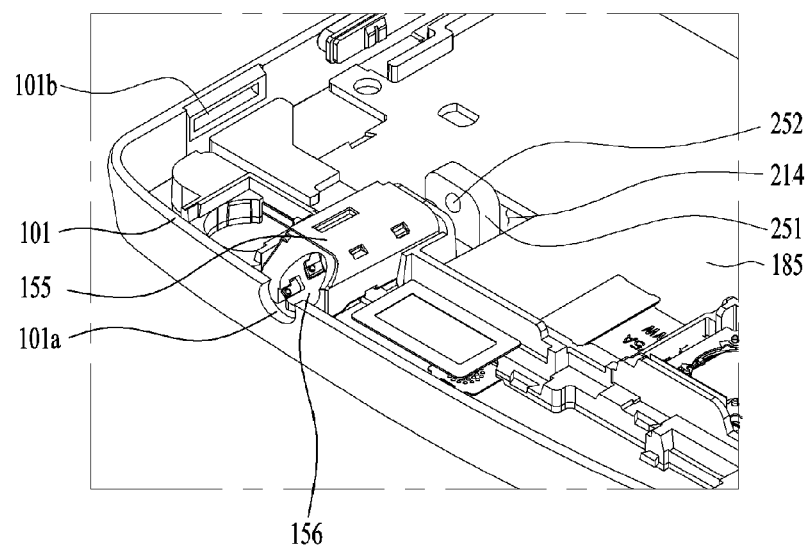
FIG. 2 is a perspective diagram illustrating a state where an ear jack module is coupled to a front case provided in one example of the mobile terminal in accordance with the present disclosure.

FIG. 2 is a perspective diagram illustrating a state where an ear jack module 155 is coupled to the front case 101 provided in one example of the mobile terminal 100 in accordance with the present disclosure. In this embodiment, an extended portion of the front case 101 and an extended portion of the rear case 102 are connected and the lateral side of the mobile terminal 100 is then formed, so that the mobile terminal 100 may have the lateral side extended from the front case 101 or the rear case 102.

The display 151 may be mounted in a front side of the front case 101 and the front case 101 provides a supporting structure of the mobile terminal 100. Such diverse components as a printed circuit board 185 are mounted in a back side of the front case 101. The front case 101 may include a metallic case for the strength and an injection mold to provide the disposing structure of the components and the coupling structure with the rear case 102. In other words, the injection mold is integrally formed in a metallic plate in the manner of double-injection molding only to realize the front case 101. The injection molding structure may be partially exposed outside the mobile terminal 100 and the external appearance of the mobile terminal may be formed.

An ear jack module 155 is mounted in the back side of the front case 101 and the ear jack module 155 includes a plug inserting portion 156 configured to insert an ear plug connected to audio equipment therein as a connection terminal for outputting sound according to an audio signal. The ear jack module 155 may be mounted in the rear surface of the front case 101 to be arranged in parallel to an ear jack hole 101a formed in the lateral side of the mobile terminal 100.

Figure 3:
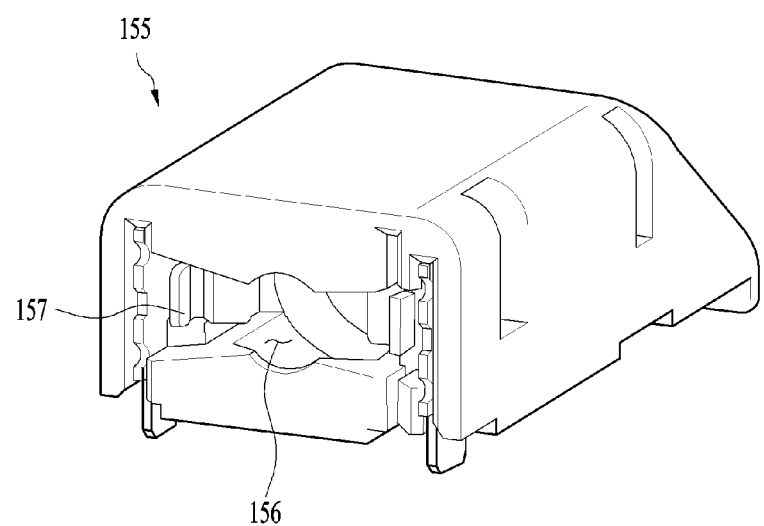
FIG. 3 is a perspective view of an ear jack provided in one example of the mobile terminal, viewed from one end of the mobile terminal.

FIG. 3 is a perspective diagram of the ear jack module 155 provided in one example of the mobile terminal 100, see from the other end. The ear jack module 155 includes the plug inserting portion 156 configured to insert the ear plug therein. A terminal 157 is exposed to an inner portion of the plug inserting portion 156 to connectedly receive the ear plug. The plug inserting portion 156 is extended from one end of the ear jack module 155 to the other end of the ear jack module in a first direction as shown in FIGS. 2 and 3, so that both ends of the plug inserting portion 156 may be open. The screw 255 is inserted in the plug inserting portion penetrating the ear jack module 155, to be fastened to the coupling structure of the front and rear cases 101 and 102 inside the plug inserting portion 156.

Referring to FIG. 2, a first fixing bracket 251 is projected from the front case 101 in a direction to the back side, adjacent to the other end of the ear jack module 155. The first fixing bracket 251 has a first screw hole 252 arranged in parallel with the plug inserting portion 156. A second fixing bracket 211 (see FIG. 4) projected from the rear case 102 in a direction to a front side is further provided in parallel with the first fixing bracket 251. The screw 255 fastens the first fixing bracket 251 and the second fixing bracket 211 to each other, to fixedly couple the front case 101 and the rear case 102 to each other.

Figure 4:
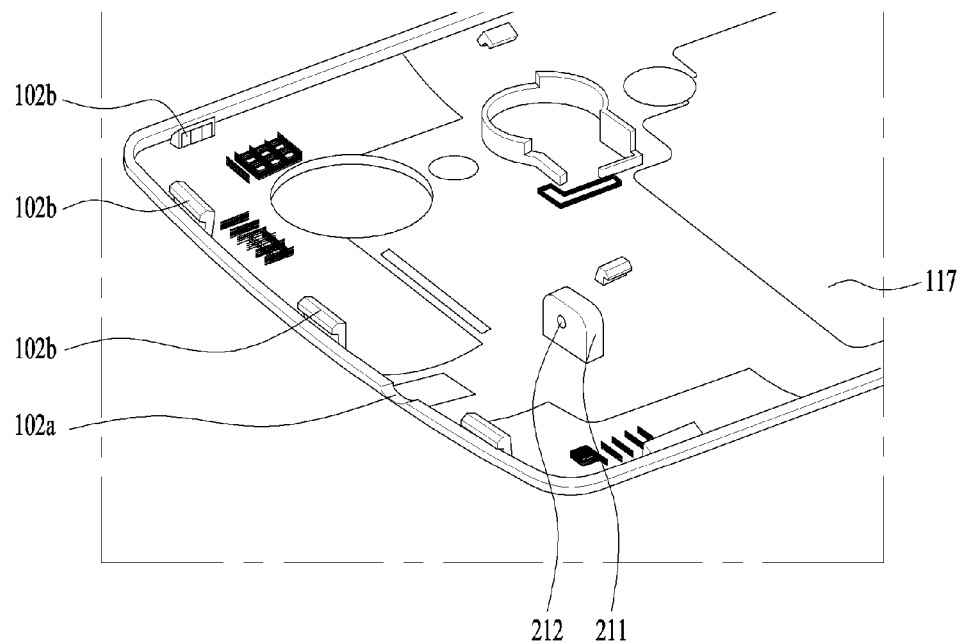
FIG. 4 is a perspective diagram illustrating a front side of a rear case provided in one example of the mobile terminal.

FIG. 4 is a perspective diagram illustrating the front side of the rear case 102 provided in one example of the mobile terminal 100. The second fixing bracket 211 projected in the direction (i.e., an upper direction in the drawings) to the front side from the rear case 102 may be arranged in parallel with the first fixing bracket 251. As shown in FIG. 2, a space 214 may be formed the portion where the second fixing bracket 211 is inserted in the printed circuit board 185 to guide the second fixing bracket 211 arranged in parallel with the first fixing bracket 251.

In other words, the second fixing bracket 211 is inserted in the space 214 surrounding by the first fixing bracket 251 and the printed circuit board 185. A first screw hole and 252 and a second screw hole 212 are arranged in parallel.

Figure 5:
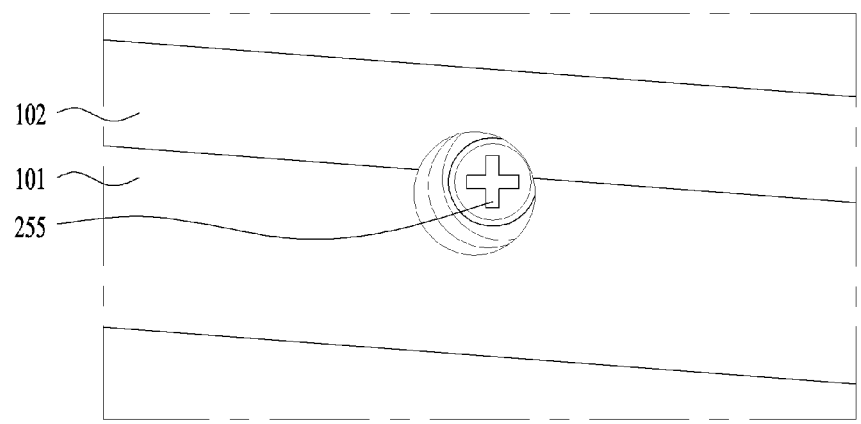
FIG. 5 is a diagram illustrating a screw inserted in an ear jack hole provided in one example of the mobile terminal.
Figure 6:
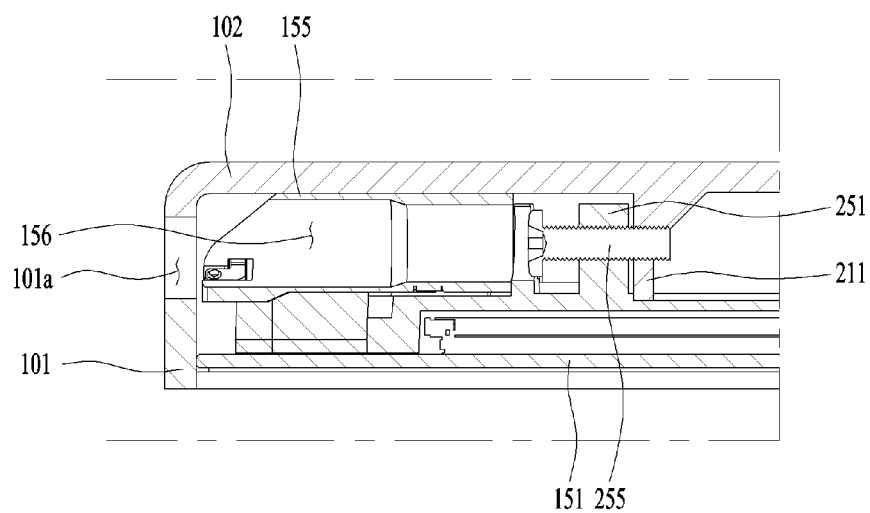
FIG. 6 is a sectional diagram along A-A line of FIG. 2.

FIG. 5 is a diagram illustrating the screw 255 inserted in an ear jack hole 101a provided in one example of the mobile terminal 100. FIG. 6 is a sectional diagram along A-A of FIG. 2. The screw 255 is inserted in the second screw hole 212 and the first screw hole 252, after penetrating the plug inserting portion 156 via the ear jack hole 101a. Then, the screw 255 is inserted as shown in FIG. 6 to fixedly couple the front case 101 and the rear case 102 to each other.

A screw thread is formed in an outer surface of the screw 255 and the screw thread moves in a first or second direction according to the rotational direction of the screw. A spiral thread groove corresponding to the screw thread of the screw is formed in each inner surface of the first and second screw holes 252 and 212, so that the screw 255 may be rotatably inserted.

Using not only the screw 255 but also coupling hooks 101b and 102b formed in edge areas of the front and rear cases 101 and 102, the front case 101 and the rear cases 102 may be coupled to each other. The coupling hooks 101b and 102b may be easily coupled to each other, not exposed outside, so that they may not affect the exterior appearance of the mobile terminal 100 advantageously. Accordingly, the front case 101 and the rear case 102 may be coupled to each other, using the coupling hooks 101b and 102b and the screw 255 at the same time.

Figure 7:
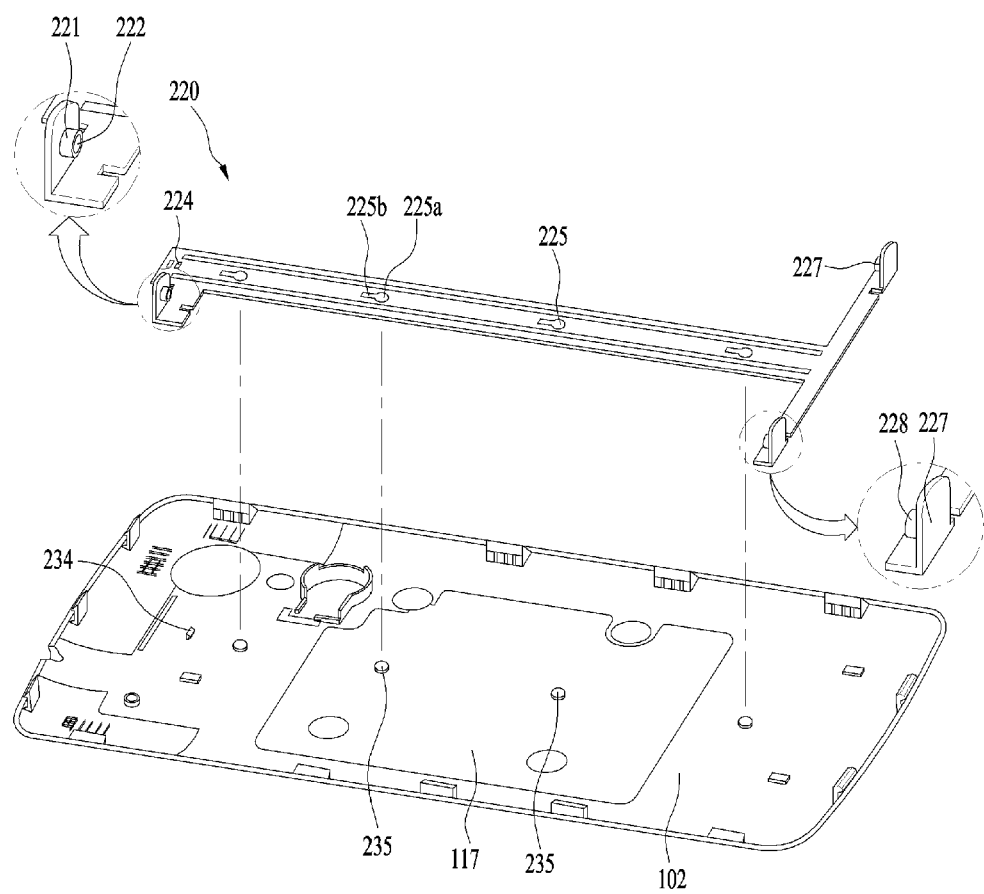
FIG. 7 is an exploded perspective diagram illustrating a rear case and a rail beam provided in another example of the mobile terminal in accordance with the present disclosure.
Figure 8:
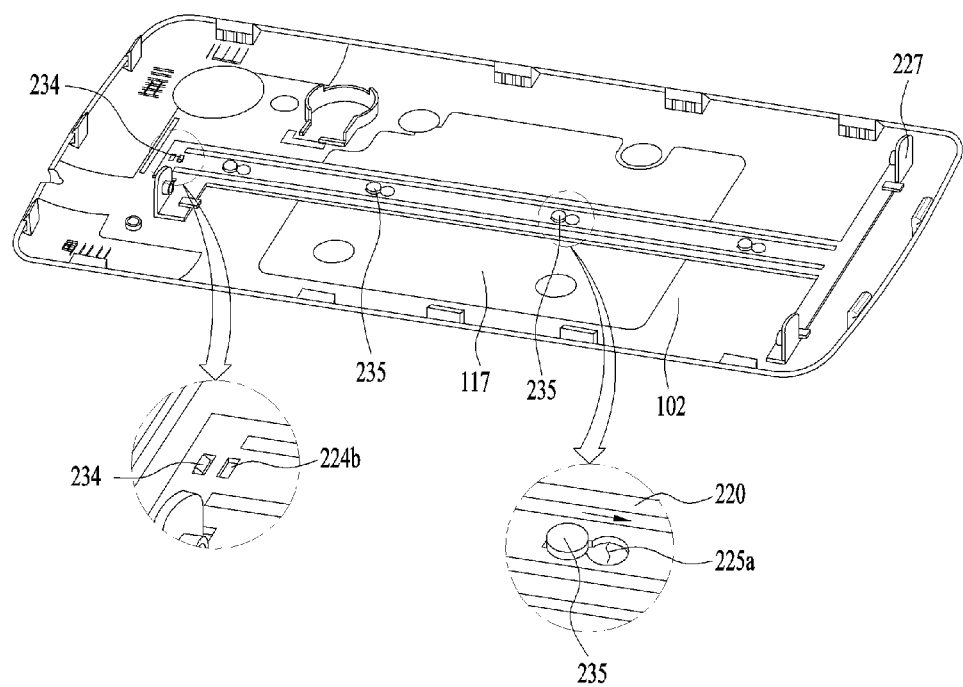
FIG. 8 is a perspective diagram illustrating a state where the rear case and the rail beam shown in FIG. 7 are coupled to each other.

FIG. 7 is an exploded perspective diagram illustrating a rear case 102 and a rail beam 220 provided in another example of the mobile terminal 100 in accordance with the present disclosure. FIG. 8 is a perspective diagram illustrating a state where the rear case 102 and the rail beam 220 shown in FIG. 7 are coupled to each other.

The rail beam 220 disclosed in this embodiment includes a second fixing bracket 221 projected in a direction (an upper direction in the drawing) to a front side of the rear case 102. The second fixing bracket 221 can slide in a first direction (i.e., a right direction in the drawings) in which the screw 255 is inserted and a second direction (i.e., a left direction in the drawing) which is the reverse direction of the first direction.

In the embodiment mentioned above, the screw is moving in the first direction or the second direction and it couples the first fixing bracket 251 and the second fixing bracket 221 to each other, when the screw 255 is rotated. However, in this embodiment, the screw 255 is not rectilinearly moved with respect to the first fixing bracket 251. When the screw 255 is rotated, the second fixing bracket 221 is moved in the first direction or the second direction. When the second fixing bracket 221 is moved, the entire rail beam 220 is moved rectilinearly.

When the screw 255 is rotated in the direction in which it is fastened to the second fixing bracket 221, the rail beam 220 is moved in the second direction. When the screw 255 is rotated in the reverse direction in which it is separated from the second fixing bracket 221, the rail beam 220 is moved in the first direction.

A bump 235 and a bump hole 225 may be used in allowing the rail beam 220 not to be separated from the rear case 102 easily, while to slide from the rear case 102 in the first and second directions. The bump 235 is projected from the rear case 102 and it has a first diameter of an end which is larger than a second diameter close to the rear case 102.

The bump 235 is inserted in the bump hole 225 formed in the rail beam 220 so that the rail beam 220 and the rear case 102 may be connected to each other. The bump hole 225 includes a first bump hole 225a larger than the first diameter of the bump 235 and a second bump hole 225b smaller than the first diameter and equal to or larger than the second diameter. The bump 235 is inserted in the first bump hole 225a and the rail beam 220 is slid in the first direction. After that, the bump 235 is positioned in the second bump hole 225b.

The rail beam 220 may be arranged along a horizontal direction cross a central portion of the rear case as shown in FIG. 7. Following trend of lessening the thickness of the edge portion for a slim design, it is preferred that the rail beam 220 is arranged cross the central portion along the horizontal direction as shown in FIG. 7. In this instance, the rail beam 220 could be overlapped with a coil antenna 117 such as an NFC antenna or a wireless charging antenna provided in the back side of the rear case 102. However, the coil antenna 117 has an empty central portion and the bump 235 can be formed in the portion where no coil is provided as shown in FIG. 7.

The second bump hole 225b has a diameter smaller than the first diameter of the bump 235, so that the rail beam 220 cannot be separated from the rear case 102. When the bump 235 is located in the first bump hole 225a by the sliding motion of the rail beam 220 in the second direction, the rail beam 220 might be separated disadvantageously. To solve the disadvantage, a rail hook 234 and a rail hook hole 224a and 224b may be used.

The rail hook 234 is the projection projected forwardly from the rear case 102, with an inclined surface. The rail hook hole 224a and 224b includes a first rail hook hole 224a and a second rail hook hole 224b which are arranged in the first direction in parallel. When the bump 235 is completely pushed to be located in an end of the second bump hole 225b, the rail hook 234 is inserted in the first rail hook hole 224a. The rail hook 234 may prevent the rail beam 200 from being moved in the first or second direction by the movement of the rear case 102.

When a predetermined force or more is applied to the rail beam 220 in the second direction, the rail hook 234 is separated from the first rail hook hole 224a and then inserted in the second rail hook hole 224b. In other words, when the rail beam 220 is moved in the second direction after the screw 255 is inserted in the second fixing bracket 221, the rail hook 234 is moved from the first rail hook hole 224a to the second rail hook hole 224b.

Figure 9:
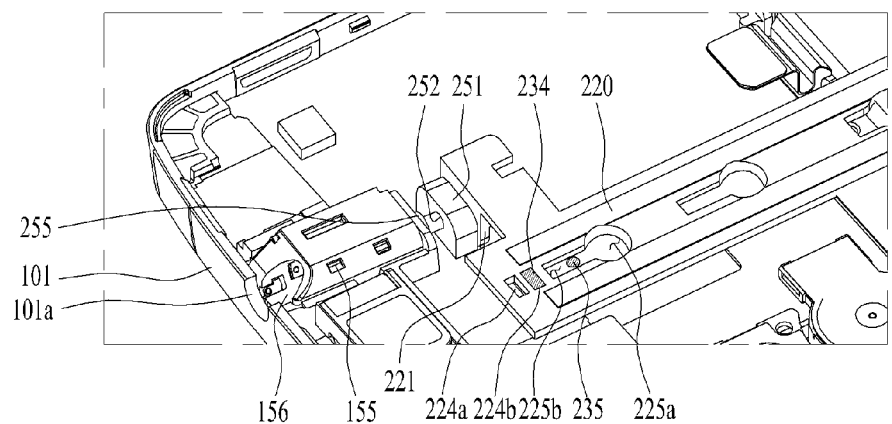
FIGS. 9 and 10 are perspective diagrams a state the rear case is omitted after the rear case and the rail beam shown in FIG. 8 are coupled to the front case.
Figure 10:
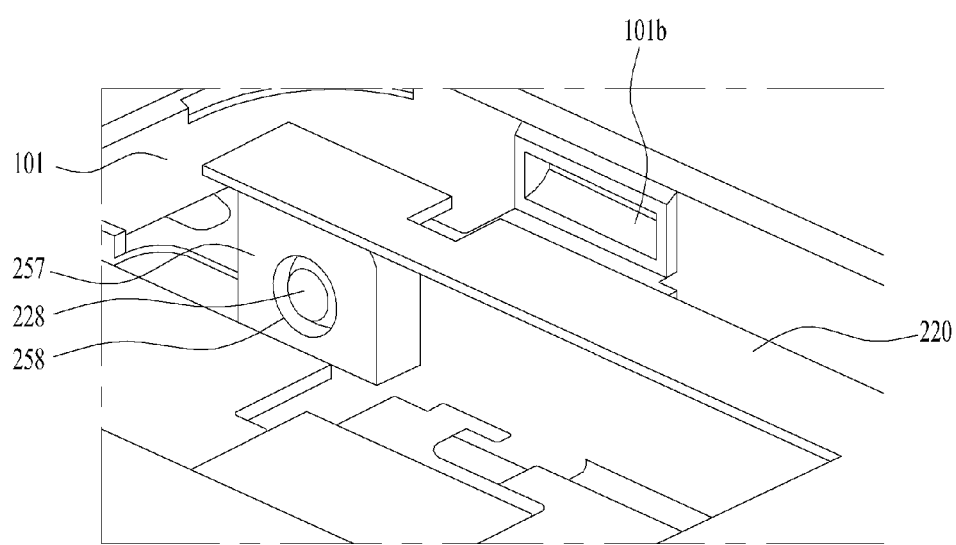

FIGS. 9 and 10 are perspective diagrams illustrating a state the rear case is omitted after the rear case 101 and the rail beam 220 shown in FIG. 8 are coupled to the front case 101. When the first fixing bracket 251 and the second fixing bracket 221 are coupled to each other, using the screw 255, the rail beam 220 is moved in the second direction. Accordingly, the rail hook 234 is located in the second rail hook hole 224b and the bump 235 is located in the portion adjacent to the first bump hole 225a, not the end portion of the second bump hole 225b.

It is difficult to check whether the first fixing bracket 251 and the second fixing bracket 221 are coupled to each other properly, because the brackets are covered with the rear case 102 and not seen. The user may check the proper coupling between the first fixing bracket 251 and the second fixing bracket 221 based on the sound generated when the rail hook 234 is moved from the first rail hook hole 224a to the second rail hook hole 224b, using the screw 255.

When using the rail beam 220, additional coupling can be performed at a plurality of points. The rail beam 220 shown in FIG. 7 may include a boss 228 extended from the other portion except the portion where the screw 255 is fastened. Bosses 228 may be lower right and left portions, respectively, when the screw 255 is provided in an upper end of the mobile terminal 100.

FIG. 10 illustrates the boss 228 inserted in a boss hole 258 connected to the front case 101. A boss hole 258 is formed in a first boss bracket 257 projected from the front case 101 and the boss 228 is formed in a second boss bracket 227 projected from the rail beam 220. When the rear case 101 is coupled to the front case 101, the first fixing bracket 251 and the second fixing bracket 221 are arranged along the first direction in parallel. Before the rail beam 220 is moved in the second direction, the boss 228 is not inserted in the boss hole 258 and arranged in parallel with the boss hole 258.

When the screw is fastened, the rail beam 220 is moved in the second direction and the boss 228 is then inserted in the boss hole 258.

In this embodiment, the boss 228 is formed in the rail beam 220. However, the boss 228 may be projected from the first boss bracket 257 in the first direction and the boss hole 258 may be formed in the second boss bracket 227. In this instance, when the rail beam 220 is moved in the second direction, the boss hole 258 is moved and the boss 228 is inserted in the boss hole 258.

The boss 228 is structured to be inserted in a hole like the screw 255 and it has a strong coupling force. Especially, as shown in FIG. 10, a second coupling hook 102b formed in the rear case 102 to be coupled to a first coupling hook 101 formed in an edge portion of the front case 101 could be separated from the first coupling hook 101b of the front case, while pushed in the second direction. However, when the rear case 102 is moved in the second direction, the coupling force between the boss 228 and the boss hole 258 is getting stronger enough to prevent the separation of the rear case 102.

Figure 11:
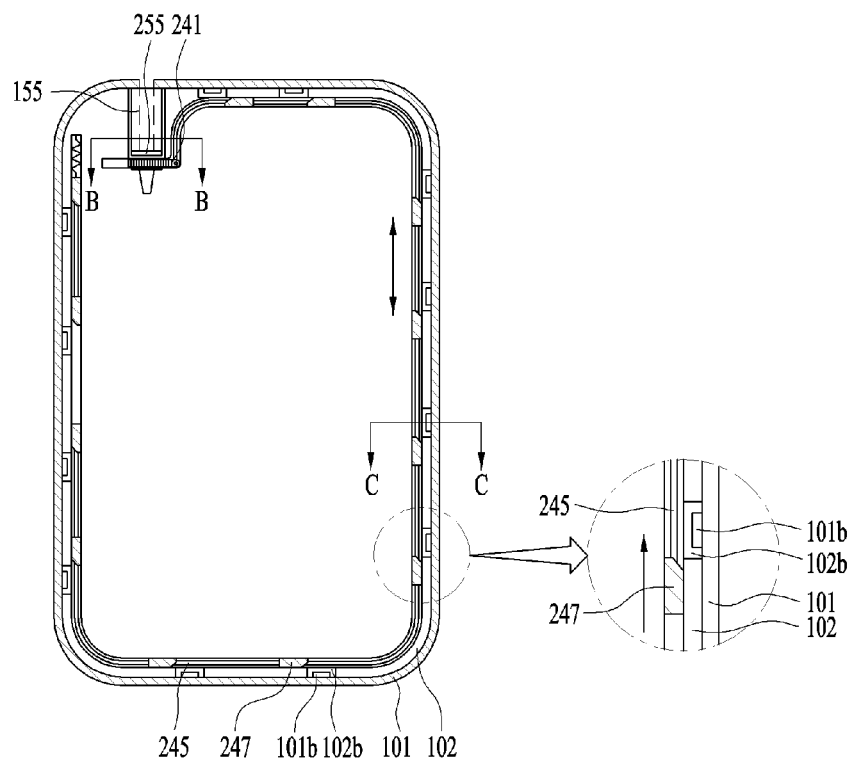
FIG. 11 is a sectional diagram of a further example of the mobile terminal in accordance with the present disclosure.
Figure 12:
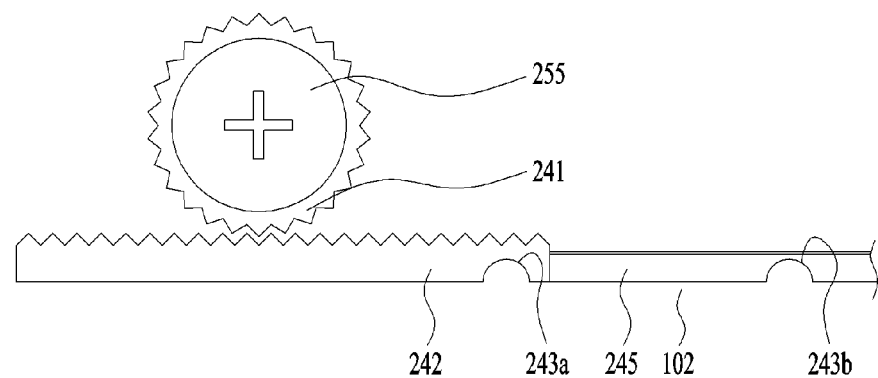
FIG. 12 is a sectional diagram along B-B line of FIG. 11.
Figure 13:
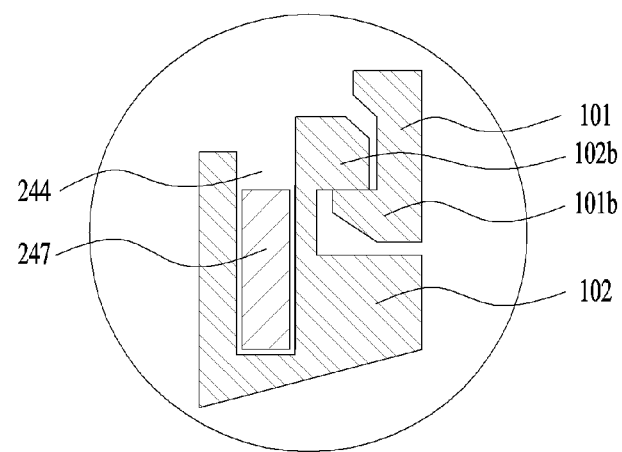
FIG. 13 is a sectional diagram along C-C line of FIG. 11.

FIG. 11 is a sectional diagram of a rear case 102 provided in a further example of the mobile terminal 100 in accordance with the present disclosure. FIG. 12 is a sectional diagram along B-B line of FIG. 11 and FIG. 13 is a sectional diagram along C-C line of FIG. 11. A first coupling hook 101b provided in an edge portion of the front case 101 is coupled to a second coupling hook 102b provided in an edge portion of the rear case 102, so that the front case 101 may be coupled to the rear case 102.

The coupling hooks are simply coupled to each other, once the user presses the rear case 102 overlapped with the back side of the front case 101. However, the coupling hooks have a disadvantage of easy separation generated by an external shock. Referring to FIG. 13, the first coupling hook 101b is provided in an external portion and the second coupling hook 102b is provided in an internal portion. While inclined to the internal portion (a left portion in the drawings), the second coupling hook 102 could be separated from the first coupling hook 101b. When a supporting material is provided within the second coupling hook 102b for the second coupling hook 102b not to be pushed internally, the second coupling hook 102b and the first coupling hook 101b may not be separated from each other.

The supporting structure is unnecessary in the process of coupling the first coupling hook 101b and the second coupling hook 102b to each other. Accordingly, the structure, which may be selectively located in a rear surface of the second coupling hook 102b, is required.

When fastening the screw 255, the rotational force is applied and the rotational force may move the supporting block 247. The rotational motion of the screw 255 is converted into rectilinear motion (see FIG. 12), using a pinion gear 241 provided in an outer surface of the screw 255, with projected teeth and a rack gear 242 configured to rectilinearly move while engaging with the teeth of the screw 255. The moving range of the rack gear 242 may be restricted, using a stopping projection 243a and 243b projected from the rear case 102.

A supporting block 247 is secured to a wire 245 connected to the rack gear 242 as shown in FIG. 11. The wire 245 and the supporting block 247 are moved according to the motion of the rack gear 242. As shown in FIG. 11, the supporting block 247 is arranged not to be overlapped with the second coupling hook 102b in a state where the screw is not fastened.

The rear case 102 is coupled to the front case 101 and the first coupling hook 101b is coupled to the second coupling hook 102b. When inserted in the ear jack hole 101a after that, the screw 255 is moved to be located in the internal surface of the second coupling hook 102b and the screw may support the internal surface of the second coupling hook 102b as shown in FIG. 13. Accordingly, the second coupling hook 102b may not be separated from the first coupling hook 101b.

As mentioned above, the embodiment is disclosed that the second coupling hook 102b is provided in a direction in which the second coupling hook 102b is arranged in the internal portion. In contrast, when the first coupling hook 101b projected from the front case 101 is provided in the internal direction, the supporting block 247 may be located in a rear surface of the first coupling hook 101b.

According to at least one of the embodiments, the coupling force between the front case and the rear case is enhanced and the exposure of the screw 255 is prevented, using the screw 255 as well as the hook. Accordingly, the mobile terminal has an advantage of an excellent external design.

Moreover, when one screw 255 is fastened, the front case 101 and the rear case 102 are coupled to each other at several points simultaneously. Accordingly, the coupling force between the front case 101 and the rear case 102 may be enhanced.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a front case having an exterior surface, an interior surface, and an ear jack hole formed in one end;
   an ear jack module disposed at the interior surface and arranged adjacent to the ear jack hole, the ear jack module including a plug inserting portion extending in a first direction, penetrating from a first end of the ear jack module to a second end of the ear jack module opposite the first end, the plug inserting portion being arranged in parallel with the ear jack hole;
   a rear case having an interior surface and an exterior surface, the interior surface of the rear case facing the interior surface of the front case;
   a first fixing bracket projected from the interior surface of the front case in a direction towards the rear case, the first fixing bracket being adjacent to the second end of the ear jack module, and the first fixing bracket including a first screw hole arranged in parallel with the plug inserting portion;

a second fixing bracket projected from an interior surface of the rear case, the second fixing bracket being adjacent to the first fixing bracket, and the second fixing bracket having a second screw hole arranged in parallel with the plug inserting portion; and a screw penetrating the ear jack hole, the first screw hole and the second screw hole.

2. The mobile terminal of claim 1, wherein a diameter of the screw is smaller than both a diameter of the ear jack hole and a diameter of the plug inserting portion.

3. The mobile terminal of claim 1, wherein the ear jack hole has a semi-circular shape and the rear case includes a hole having a semi-circular shape adjacent the ear jack hold when the front case and rear case are coupled to each other.

4. The mobile terminal of claim 1, wherein a screw thread is formed in each of the first and second screw holes.

5. The mobile terminal of claim 1, further comprising a rail beam coupled to the rear case and configured to slide in the first direction and a second direction opposite to the first direction, wherein the second fixing bracket is coupled to the rail beam.

6. The mobile terminal of claim 5, wherein, when the screw is driven into the second screw hole of the second fixing bracket, the rail beam is configured to slide in the second direction.

7. The mobile terminal of claim 6, further comprising a bump projected from the interior surface of the rear case, one end of the bump spaced from the interior surface of the rear case having a first diameter that is greater than a second diameter of another end of the bump adjacent to the rear case, wherein the rail beam includes a first bump hole larger than the first diameter of the bump and a second bump hole extending from the first bump hole in the second direction, the second bump hole being smaller than the first diameter of the bump.

8. The mobile terminal of claim 7, wherein the bump is located in an end of the second bump hole when the rail beam is located at a first position, and the bump is located in a middle portion of the second bump hole when the rail beam is at a second position.

9. The mobile terminal of claim 8, further comprising a rail hook projected from the rear case in a direction towards the front case, the rail hook including an inclined surface, wherein the rail beam includes first and second rail hook holes arranged along the first direction, wherein the rail hook is inserted in the first rail hook hole when the rail beam is in the first position and inserted in the second rail hook hole when the rail beam is in the second position.

10. The mobile terminal of claim 9, wherein the rail beam is movable between the first position and the second position by turning of the screw relative to the second screw hole.

11. The mobile terminal of claim 6, further comprising:

a first boss bracket projected from the interior surface of the rear case, the first boss bracket having a boss hole; and a second boss bracket projected from the rail beam towards the interior surface of the front case, the second boss bracket having a boss projected from the second boss bracket in the second direction and inserted in the boss hole.

12. The mobile terminal of claim 11, wherein the ear jack module is provided in a predetermined portion of the mobile terminal, and wherein the first boss bracket and the second boss bracket are provided in a portion of the mobile terminal other than the predetermined portion.

13. The mobile terminal of claim 11, wherein the boss is extended from the second boss bracket in the second direction.

14. The mobile terminal of claim 1, further comprising:

a first coupling hook projected from an edge portion of the front case towards the rear case; and a second coupling hook projected from an edge portion of the rear case towards the front case, the second coupling being coupled to the first coupling hook.

15. The mobile terminal of claim 14, further comprising:

a pinion gear mounted on the screw;

a rack gear rectilinearly movable by rotation of the pinion gear;

a wire connected to the rack gear to move together with the rack gear; and a supporting block connected to the wire and configured to move with the wire, wherein the supporting block is displaceable into and out of the second coupling hook in response to rotation of the pinion gear, the supporting block being configured to prevent the second coupling hook from being separated from the first coupling hook.

16. An assembling method of a mobile terminal comprising steps of:

mounting an ear jack module between an ear jack hole formed in one end of a front case and a first fixing bracket projected from an interior surface of the front case, the ear jack module having a plug inserting portion;

coupling a rear case having a second fixing bracket projecting from an interior surface of the rear case to the front case such that the second fixing bracket is in parallel with the first fixing bracket; and fastening a screw through the first and second fixing brackets via the ear jack hole and the plug inserting portion of the ear jack module.

17. The assembling method of the mobile terminal of claim 16, further comprising slidingly coupling a rail beam having the second fixing bracket to the rear case in a first direction, before coupling the rear case to front case.

18. The assembling method of the mobile terminal of claim 16, wherein coupling the rear case to front case includes coupling a first coupling hook projected from an edge portion of the front case towards the rear case to a second coupling hook projected from an edge portion of the rear case towards the case, and wherein fastening the screw causes a supporting block connected to a wire rectilinearly movable according to the rotation of the screw to be positioned adjacent to the second hook.

* * * * *